No. 725,043. PATENTED APR. 14, 1903.
A. CLAWSON.
LIFTING AND DROPPING GATE.
APPLICATION FILED AUG. 5, 1902.
NO MODEL.
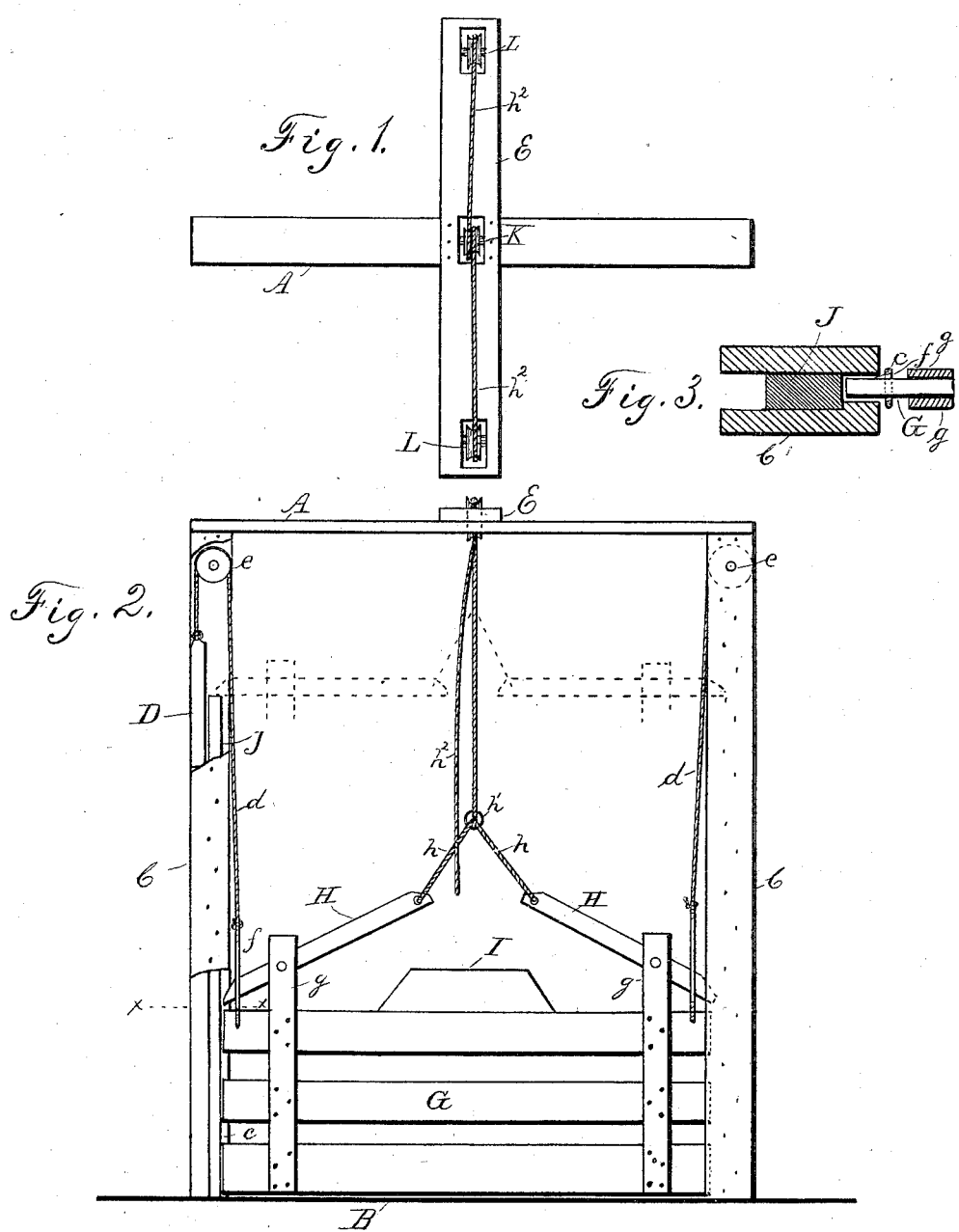
WITNESSES:
P. J. Moran
Chas. D. Swett
INVENTOR
Aquiller Clawson
BY Thomas P. Simpson
ATTORNEY

UNITED STATES PATENT OFFICE.

AQUILLER CLAWSON, OF CHICAGO, ILLINOIS, ASSIGNOR OF ONE-HALF TO JOSEPH E. EASTBURN, OF CHICAGO, ILLINOIS.

LIFTING AND DROPPING GATE.

SPECIFICATION forming part of Letters Patent No. 725,043, dated April 14, 1903.

Application filed August 5, 1902. Serial No. 118,445. (No model.)

*To all whom it may concern:*

Be it known that I, AQUILLER CLAWSON, a citizen of the United States, residing at Chicago, in the county of Cook and State of Illinois, have invented certain new and useful Improvements in Lifting and Dropping Gates; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to gates which are raised to allow vehicles to pass under them and then lowered into place by suitable mechanism.

The special object of the invention is to so improve this class of gates that they may be conveniently operated by the driver without leaving his seat on the vehicle.

Figure 1 of the drawings is a plan view of the gate and its appurtenances, and Fig. 2 a side elevation of the same. Fig. 3 is a section on line $x$ $x$ of Fig. 2.

In the drawings, A represents the top, B the bottom, and C C the side posts of the frame, of my gate. The latter is movable up and down in grooves $c$ $c$ of the posts and is preferably provided with balance or counter weights D D, connected with the top rail of gate by cords $d\,d$, pulleys $e\,e\,e$, and loops $f\,f$.

E is a cross-bar, made fast to the top bar A, at the middle thereof and at right angles thereto.

G is the gate, between whose uprights $g\,g$ are fulcrumed two oppositely-placed levers H H, which are supported in front by the rest I on the top rail of gate, while the other ends are sustained by the catches J between the sides of the posts C. In that position the gate is upheld while the vehicle passes under it. The front ends of the levers H are connected by a cord $h$, which passes through a ring $h'$, the latter being connected by two cords $h^2\,h^2$, which pass over a middle pulley K and then in opposite directions over the end pulleys L L, the said pulleys being arranged on their bearings in holes of the crossbar E. The latter being made to point up and down the road, the gate may be conveniently raised by persons coming from opposite directions. A pull on one of the cords $h^2$ will carry the gate up to the top of frame when the cord is let go. This causes the levers H H to lock on the rests J J and hold the gate up securely while the vehicle is passing thereunder. Then the opposite cord is pulled up to unlock the levers and is held taut while the gate is gradually lowered into its place.

What I claim as new, and desire to protect by Letters Patent, is—

1. The combination with a lifting and dropping gate, of the two levers H H, each having a front rest I on the gate and a rear catch in a vertical groove of the gate-frame substantially as shown and described, for the purpose set forth.

2. The combination with a lifting and dropping gate, having the uprights $g\,g$, of the levers H H, cord $h$, ring $h'$, cords $h^2\,h^2$, the frame-bar A, cross-bar E and pulleys L K L, all arranged substantially as shown, for the purpose specified.

In testimony whereof I affix my signature in presence of two witnesses.

AQUILLER CLAWSON.

Witnesses:
JOHN BURKE FOUSHEL,
JOSEPH B. EASTBURN.